United States Patent
Niemann et al.

(10) Patent No.: US 9,372,102 B2
(45) Date of Patent: Jun. 21, 2016

(54) GAS SENSOR AND MOTOR VEHICLE WITH A GAS SENSOR

(71) Applicant: Hella KGaA Hueck & Co., Lippstadt (DE)

(72) Inventors: Thomas Niemann, Delmenhorst (DE); Jürgen Palloks, Westerstede (DE); Volker Skwarek, Wesenberg (DE); Falko Strackerjan, Bremen (DE)

(73) Assignee: HELLA KGaA HUECK & CO., Lippstadt (DE)

(*) Notice: Subject to any disclaimer, the term of this patent is extended or adjusted under 35 U.S.C. 154(b) by 1 day.

(21) Appl. No.: 14/485,001

(22) Filed: Sep. 12, 2014

(65) Prior Publication Data

US 2015/0075281 A1 Mar. 19, 2015

(30) Foreign Application Priority Data

Sep. 13, 2013 (DE) .................. 10 2013 015 218

(51) Int. Cl.
*G01N 27/404* (2006.01)
*G01D 11/24* (2006.01)
*G01F 3/20* (2006.01)

(52) U.S. Cl.
CPC .............. *G01D 11/245* (2013.01); *G01F 3/20* (2013.01)

(58) Field of Classification Search
CPC ........................... G01D 11/24; G01N 27/404
USPC .......................................................... 73/431
See application file for complete search history.

(56) References Cited

U.S. PATENT DOCUMENTS

| | | | | |
|---|---|---|---|---|
| 3,909,218 A * | 9/1975 | Kumura | .................. | B01D 53/22 96/7 |
| 4,406,770 A * | 9/1983 | Chan | .................. | G01N 33/0011 204/406 |
| 4,633,704 A * | 1/1987 | Tantram | ............. | G01N 33/0011 204/415 |
| 4,990,236 A * | 2/1991 | Sittler | .................. | G01N 27/423 204/290.08 |
| 5,692,637 A * | 12/1997 | Hodge | ................. | G01L 19/0654 174/17 VA |
| 7,568,393 B2 * | 8/2009 | Adam | .................. | G01L 19/0007 73/700 |
| 7,626,129 B2 | 12/2009 | Sasaki et al. | | |
| 8,413,496 B2 | 4/2013 | Eslami et al. | | |
| 2003/0010635 A1 * | 1/2003 | Kiesele | ............. | G01N 33/0009 204/415 |
| 2011/0113860 A1 * | 5/2011 | Nylander | ........... | G01N 33/0009 73/31.07 |
| 2016/0033446 A1 * | 2/2016 | McGuinness | ........ | G01N 27/404 205/793 |

FOREIGN PATENT DOCUMENTS

| | | |
|---|---|---|
| CH | 689925 A5 | 1/2000 |
| DE | 1673510 A | 3/1972 |
| DE | 2127994 A | 12/1972 |
| DE | 2309315 A | 9/1973 |
| DE | 2831178 A1 | 1/1980 |

(Continued)

*Primary Examiner* — Lisa Caputo
*Assistant Examiner* — Jamel Williams
(74) *Attorney, Agent, or Firm* — Muncy, Geissler, Olds & Lowe, P.C.

(57) ABSTRACT

In a gas sensor comprising a housing, a membrane and a sensor element, wherein the housing comprises a measuring chamber and an air supply opening, the sensor element is disposed in the measuring chamber and the membrane separates the measuring chamber from the air supply opening, a particularly good air exchange should be achieved. This is accomplished by providing a flow guiding device in the air supply opening of the housing. The flow guiding device here projects into the housing.

8 Claims, 1 Drawing Sheet

(56) References Cited

FOREIGN PATENT DOCUMENTS

| | | |
|---|---|---|
| DE | 3703528 C1 | 9/1987 |
| DE | 4035447 A1 | 4/1992 |
| DE | 29505570 U1 | 9/1995 |
| DE | 69213904 T2 | 2/1997 |
| DE | 29705673 U1 | 5/1997 |
| DE | 69219171 T2 | 10/1997 |
| DE | 29801297 U1 | 6/1998 |
| DE | 69503505 T2 | 4/1999 |
| DE | 60002044 T2 | 12/2003 |
| DE | 60101879 T2 | 7/2004 |
| DE | 202004013614 U1 | 12/2004 |
| DE | 102005020569 A1 | 11/2006 |
| DE | 60121910 T2 | 7/2007 |
| DE | 102006006540 A1 | 8/2007 |
| DE | 10 2006 058 301 A1 | 6/2008 |
| DE | 10 2008 004 358 A1 | 7/2009 |
| DE | 102009008968 A1 | 8/2009 |
| DE | 102008015322 A1 | 9/2009 |
| DE | 112007002725 T2 | 9/2009 |
| DE | 102008043323 A1 | 5/2010 |
| EP | 0311238 BI | 4/1992 |
| EP | 1 784 066 A1 | 5/2007 |
| WO | WO 93/07457 A1 | 4/1993 |
| WO | WO 96/03629 A1 | 2/1996 |
| WO | WO 2012/023888 A1 | 2/2012 |

* cited by examiner

GAS SENSOR AND MOTOR VEHICLE WITH A GAS SENSOR

BACKGROUND OF THE INVENTION

1. Field of the Invention

The invention relates to a gas sensor comprising a housing, a membrane and a sensor element, wherein the housing comprises a measuring chamber and an air supply opening, the sensor element is disposed in the measuring chamber and the membrane separates the measuring chamber from the air supply opening.

2. Brief Discussion of the Related Art

Such gas sensors are known in particular in the automobile industry and are used as air quality sensors for the detection of air in the interior of vehicles.

In such gas sensors which are closed with a gas-permeable membrane, gas exchange between the measuring chamber and the surroundings is only made possible by diffusion and/or surface flow and turbulence effects. As a result, the gas exchange is comparatively slow and therefore also the response time of the gas sensor or the sensor element provided in the gas sensor. Gas exchange is also made difficult when the temperatures in the measuring chamber are higher than in the surroundings.

SUMMARY OF THE INVENTION

It is the object of the invention to improve the response behaviour of the gas sensor.

This object is solved with a gas sensor having the features of patent claim 1. Advantageous embodiments of the invention are given in the subclaims.

A gas sensor comprising a housing, a membrane and a sensor element, wherein the housing comprises a measuring chamber and an air supply opening, the sensor element is disposed in the measuring chamber and the membrane separates the measuring chamber from the air supply opening, is provided as essential to the invention that a flow guiding device is disposed in the air supply opening of the housing and the flow guiding device has a contour which forms a uniformly wide flow channel between the flow guiding device and the wall of the air supply opening.

With such a flow guiding device the air and gas flow is guided onto the membrane.

The membrane is in this case preferably disposed at a distance from the air supply opening of the housing and air passing by the gas sensor therefore does not directly reach the membrane and the sensor element disposed therebehind. This is only made possible by the flow guiding device. This is designed and shaped in such a manner that air is guided to the membrane and the measuring chamber located therebehind with the sensor element.

In a preferred embodiment of the invention, the flow guiding device projects into the housing. A particularly effective guidance of the gas flow in the housing is thereby made possible. Furthermore, the flow guiding device preferably protrudes beyond the housing. As a result it can in particular be achieved that the air flowing otherwise flatly past the housing is deflected into the housing by the flow guiding device protruding from the air supply opening. Preferably when viewed in the height-wise extension, approximately half the flow guiding device is inside the housing whilst the other half of the flow guiding device is outside the housing. Approximately half is to be understood as a deviation of less than +/−50%, preferably of less than +/−20%. In the housing the air supply opening is preferably configured to be circular and/or point-symmetrical or symmetrical with respect to a central axis. The flow guiding device is also preferably constructed symmetrically to a central perpendicular. The individual components here are constructed to be circular or annular. Other configurations such as, for example, square or rectangular configurations are also feasible. In a preferred embodiment the flow guiding device is configured to be funnel-shaped. The wide part of the funnel protrudes beyond the air supply opening and is disposed outside the air supply opening. One could also talk of a conical configuration where the flanks do not form a straight line in cross-section but have a curved profile and expand outwards. At the widest point the width of the funnel-shaped flow guiding device is wider than the air supply opening in the housing. The air supply opening is preferably pot-shaped with an edge which expands outwards in a circular segment shape. The position and shape of the edge configured in a circular segment shape corresponds to the position and shape of the curvature of the wall of the funnel-shaped flow guiding device.

The flow guiding device has a contour which forms a uniformly wide flow channel or flow ring between the flow guiding device and the wall of the air supply opening. With a flat configuration of the air supply opening a flow ring is obtained. When the air supply opening is configured to be pot-shaped or three-dimensional, a flow channel is formed along the wall forming the air supply opening. A uniformly wide flow channel is understood to mean that deviations in the width are less than +/−50% of the average width of the flow channel, in particular less than +/−30% of the average width and particularly preferably less than +/−10% of the average width of the flow channel. Particularly preferably the width is precisely the same everywhere. The starting point and also initial point of this flow channel is in this case located outside the air supply opening since the flow guiding device protrudes from the air supply opening.

In another preferred embodiment of the invention the flow guiding device has an inner passage which is preferably also configured as an inner funnel which is directed onto the membrane. Preferably the diameter of the inner passage at its narrowest point is less than a factor of 1.5 smaller than or preferably greater than the width of the channel formed between the wall of the air supply opening and the flow guiding device. In this way it is ensured that even air impinging directly on the air supply opening is guided directly onto the membrane and thereby then also enters into the measuring chamber.

The sensor element is preferably disposed closer to the rear wall of the measuring chamber than to the membrane. In this case, preferably the sensing side of the sensor element is facing the membrane. As a result, a particularly good inflow to the sensor element, in particular the sensing side of the sensor element is achieved.

A further aspect of the invention consists in providing a motor vehicle with a gas sensor of the type described above. In particular, the gas sensor is used for monitoring the air quality in the interior of a motor vehicle. The gas sensor is then preferably coupled to an air-conditioning system and/or air supply valves of the motor vehicle.

BRIEF DESCRIPTION OF THE DRAWINGS

The invention is explained further hereinafter with reference to a preferred exemplary embodiment shown in the drawing. In detail in the schematic diagrams.

DETAILED DESCRIPTION OF THE PREFERRED EMBODIMENTS

Figure 1:
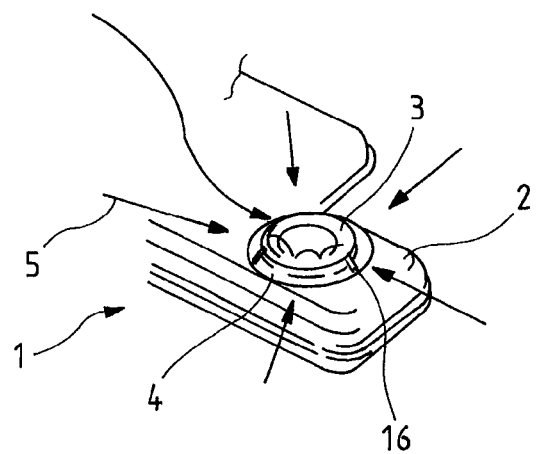
FIG. 1 shows a perspective view of a gas sensor according to the invention.

FIG. 1 shows a gas sensor 1 in perspective view. This comprises a housing 2 in which an air supply opening 4 is provided. The air supply opening 4 is configured to be circular. A flow guiding device 3 is held in the air supply opening 4 via webs 16 This projects with its outer part 11 beyond the housing 2 and is guided into the housing 2 with its inner part 12. By means of the flow guiding device 3 air from all directions which is indicated here by arrows 5 is guided in an intensified manner into the gas sensor 1. This results in a more rapid air exchange in the gas sensor 1 and the response time of the gas sensor 1 is reduced.

The deflecting device is preferably configured in one piece. In other embodiments however, this can be constructed of several elements or also configured as a component of the housing 2.

Figure 2:
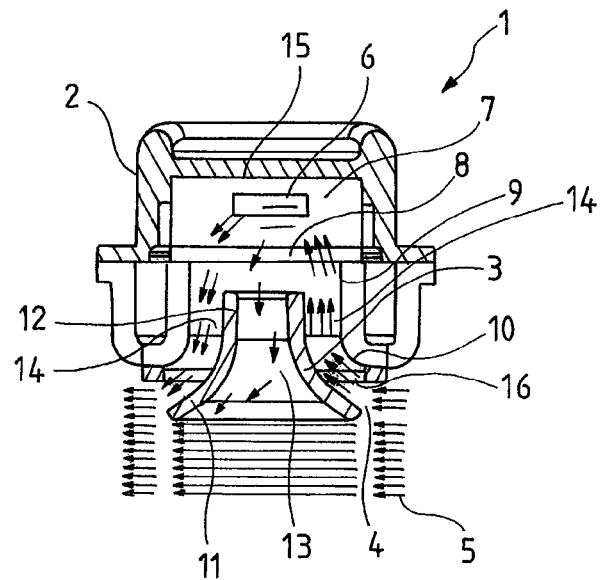
FIG. 2 shows a cross-sectional view through a gas sensor according to the invention with a gas flow parallel to the gas sensor and FIG. 3 shows a cutaway view through a gas sensor according to the invention with a flow perpendicular to the gas sensor.

FIG. 2 shows a cross-section through the gas sensor 1 according to the invention. A sensor element 6 is disposed inside the housing 2. This is disposed in a suspended or floating manner in a measuring chamber 7. The measuring chamber 7 is separated from the air supply opening 4 towards the outside by a membrane 8 which is gas-permeable. The air supply opening 4 is configured to be pot-like and has an inner wall 9 which is configured to be perpendicular and leads to the membrane 8. At the upper edge the housing 2 is configured with a radius so that an edge 10 which expands outwards in a circular segment shape is obtained. The flow guiding device 3 is inserted centrally in this air supply opening 4 and held there by webs 16. The flow guiding device 3 is here configured in one piece. The flow guiding device 3 is configured to be funnel-shaped and is disposed with its contours approximately equidistant from the wall 9 and the edge 10 of the air supply opening 4. This results in a flow channel 14 between the flow guiding device 3 and the wall 9 which leads to the membrane 8, leads along the membrane 8 and lads out again on the other side or is configured in an annular shape around the flow guiding device 3. This flow channel or flow ring has approximately the same width everywhere. This should be understood to mean that any differences are less than a factor of 1.5, preferably less than a factor of 1.2. Arrows 5 showing the air flow are depicted in the figure. The flow guiding device 3 also has an inner passage 13 which is also configured in a funnel shape and through which air can enter or leave. In the case of the air flow shown in FIG. 2, which takes place substantially parallel to the housing 2, air will substantially enter through the outer flow channel 14 and leave again through the passage 13. The distance from the front side of the flow guiding device 3 to the membrane 8 is approximately exactly as large as the distance of the funnel or the flow guiding device 3 from the side, i.e. from the walls 9 of the air supply opening 4. The sensor element 6 is disposed at a distance from the membrane 8 in the closed measuring chamber 7. The distance from the membrane 8 is greater, preferably twice as great as the distance of the sensor element 6 from the wall 15 of the measuring chamber 7 opposite the membrane 8. The sensing side of the sensor element 6 is facing the membrane 8. The air flow or the air passing through the membrane 8 impinges upon this side. It can furthermore be identified that the flow guiding device 3 projects with an inner part 12 into the air supply opening 4 whilst an outer part 11 of the flow guiding device 3 protrudes beyond the air supply opening 4.

Figure 3:
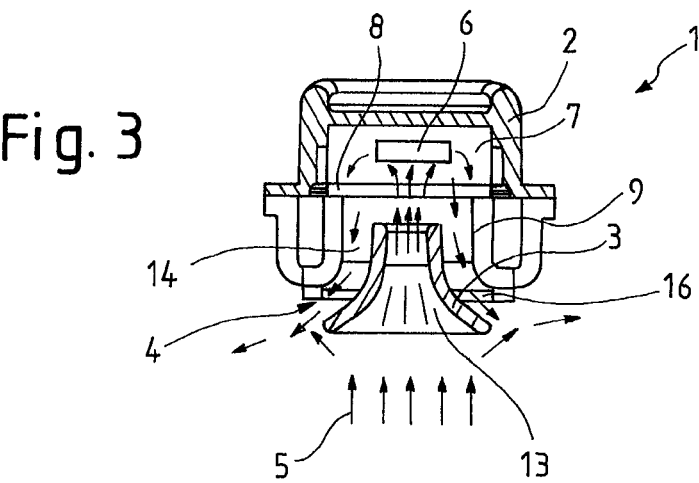

FIG. 3 shows a gas sensor 1 according to the invention which corresponds to the gas sensor 1 shown in FIG. 2. Here also the gas sensor 1 is shown in a cross-sectional view. Unlike FIG. 2, here however the flow is directed perpendicularly onto the gas sensor 1. Accordingly the arrows 5 which reproduce the air flow are configured differently. Otherwise the same reference numbers correspond to the same parts. In this respect reference is made to the description to FIGS. 1 and 2. The air flow 4 here enters substantially through the region of the flow guiding device 3 which expands in a funnel shape in the inner passage 13 and is guided onto the membrane 8 in the end region of the flow guiding device 3. The air passes through the membrane 8 and impinges upon the sensitive side of the sensor element 6 in the measuring chamber 7. The air then flows back substantially in the outer channels or in the outer annular channel 14. The width of the passage 13 in the front region, i.e. the region facing the membrane 8 is approximately as wide as the width of the flow channel 14 in cross-section.

Overall as a result of the invention it is achieved that the gas exchange inside the measuring chamber 7 is optimized. This is accomplished despite the typically higher temperature inside the measuring chamber 7 compared to the temperature outside the measuring chamber 7. A more rapid response behaviour of the sensor element 6 is thereby achieved. By improving the gas exchange in regard to the exchange volume, an improved sensitivity is also achieved. With the flow guiding device 3 according to the invention, the gas flow is detected from all sides independent of direction. The sensor can therefore also be installed independently of the flow direction.

All the features mentioned in the preceding description and in the claims can be combined in an arbitrary selection with the features of the independent claim. The disclosure of the invention is therefore not restricted to the described or claimed feature combinations but rather all appropriate feature combinations within the framework of the invention should be considered to be disclosed.

The invention claimed is:

1. A gas sensor comprising a housing, a membrane, and a sensor element, wherein the housing comprises a measuring chamber and an air supply opening, the sensor element is disposed in the measuring chamber and the membrane separates the measuring chamber from the air supply opening, wherein:
   a flow guiding device is disposed in the air supply opening of the housing;
   the flow guiding device has a contour which forms a uniformly wide flow channel between the flow guiding device and the wall of the air supply opening;
   the flow channel is configured in an annular shape around the flow guiding device;
   the flow guiding device forms an inner passage, which is directed perpendicular to the membrane; and
   the flow guiding device protrudes beyond the housing so that an airflow substantially parallel to the supply opening will substantially enter through the outer flow channel.

2. The gas sensor according to claim 1, wherein the flow guiding device projects into the housing.

3. The gas sensor according to claim 1, wherein the air supply opening and the flow guiding device are configured symmetrically to a central perpendicular.

4. The gas sensor according to claim 1, wherein the flow guiding device is configured in a funnel shape.

5. The gas sensor according to claim 1, wherein the air supply opening is configured to be pot-like with an edge extending outwards in the manner of a circular segment.

6. The gas sensor according to claim 1, wherein the inner passage of the flow guiding device is configured to be funnel-shaped.

7. The gas sensor according to claim 1, wherein the diameter of the inner passage at its narrowest point is less than a factor of 1.5 smaller or larger than the width of the flow channel formed between the wall of the air supply opening and the flow guiding device.

8. A motor vehicle comprising a gas sensor according to claim 1.

\* \* \* \* \*